United States Patent
Gasperino et al.

(10) Patent No.: US 11,253,434 B2
(45) Date of Patent: Feb. 22, 2022

(54) PACIFIER DEVICE FOR METERED DOSING OF SUPPLEMENTS TO INFANTS

(71) Applicant: Tokitae LLC, Bellevue, WA (US)

(72) Inventors: David Gasperino, Lake Forest Park, WA (US); Fridrik Larusson, Seattle, WA (US); Shieng Liu, Bellevue, WA (US); Nels R. Peterson, Bellevue, WA (US); David J. Yager, Carnation, WA (US)

(73) Assignee: Tokitae, LLC, Bellevue, WA (US)

( * ) Notice: Subject to any disclaimer, the term of this patent is extended or adjusted under 35 U.S.C. 154(b) by 276 days.

(21) Appl. No.: 15/882,618

(22) Filed: Jan. 29, 2018

(65) Prior Publication Data
US 2018/0221247 A1      Aug. 9, 2018

Related U.S. Application Data

(60) Provisional application No. 62/454,199, filed on Feb. 3, 2017.

(51) Int. Cl.
*A61J 11/00*      (2006.01)
*G01F 13/00*      (2006.01)
(Continued)

(52) U.S. Cl.
CPC ......... *A61J 11/0015* (2013.01); *A61J 7/0053* (2013.01); *A61J 11/0005* (2013.01);
(Continued)

(58) Field of Classification Search
CPC ...... A61J 11/00; A61J 11/0005; A61J 11/001; A61J 11/0015; A61J 11/002; A61J 11/0025; A61J 11/003; A61J 11/0035; A61J 11/004; A61J 11/0045; A61J 11/005; A61J 11/0055; A61J 11/006; A61J 11/0065; A61J 11/007; A61J 11/0075; A61J 11/008; A61J 11/0085; A61J 11/009; A61J 11/0095;
(Continued)

(56) References Cited

U.S. PATENT DOCUMENTS

| 3,178,081 A | 4/1965 | David |
| 3,790,016 A | 2/1974 | Kron |

(Continued)

FOREIGN PATENT DOCUMENTS

| TW | 376741 U | 12/1999 |
| WO | 2009132334 A1 | 10/2009 |

OTHER PUBLICATIONS

PCT International Search Report; International App. No. PCT/US2018/015861; dated Jun. 5, 2018; pp. 1-3.
(Continued)

*Primary Examiner* — Theodore J Stigell
*Assistant Examiner* — Rachel T. Smith
(74) *Attorney, Agent, or Firm* — Adam L. K. Philipp; Shan Liao; AEON Law

(57) ABSTRACT

Pacifier devices with internal reservoirs and metering units are described. The metering units provide single dosages of an internal supplement material during a fixed period of time. For example, embodiments of pacifier devices can be utilized to provide supplemental nutrition paste or gel to undernourished infants with metered dosages as appropriate to the supplement.

10 Claims, 13 Drawing Sheets

(51) Int. Cl.
    *G01F 11/08*     (2006.01)
    *A61J 7/00*     (2006.01)
    *A61J 17/00*     (2006.01)

(52) U.S. Cl.
    CPC .......... *G01F 11/086* (2013.01); *G01F 13/005* (2013.01); *A61J 11/001* (2013.01); *A61J 17/001* (2015.05)

(58) Field of Classification Search
    CPC . A61J 11/02; A61J 11/04; A61J 11/045; A61J 17/001; A61J 7/0053
    See application file for complete search history.

(56) References Cited

U.S. PATENT DOCUMENTS

| | | |
|---|---|---|
| 5,013,321 A | 5/1991 | MacVane |
| 5,123,915 A | 6/1992 | Miller et al. |
| 6,109,100 A * | 8/2000 | Buckley ............... A61J 9/00 604/76 |
| 6,454,788 B1 | 9/2002 | Ashton |
| 2004/0188372 A1 | 9/2004 | Ruth et al. |
| 2006/0124668 A1 | 6/2006 | Pagovich et al. |
| 2009/0054771 A1 | 2/2009 | Kolberg et al. |
| 2014/0296915 A1 * | 10/2014 | Finney ............... A61J 7/0053 606/236 |
| 2015/0257979 A1 * | 9/2015 | Jenema ............... A61J 7/0053 604/516 |

OTHER PUBLICATIONS

Taiwanese Office Action dated Jul. 6, 2021 along with English translation of Taiwanese Office action.

European Search Report; EP Appln No. 18747675.9; dated Oct. 16, 2020.

* cited by examiner

PACIFIER DEVICE FOR METERED DOSING OF SUPPLEMENTS TO INFANTS

PRIORITY APPLICATIONS

The present application claims benefit of priority of U.S. Provisional Patent Application No. 62/454,199, entitled PACIFIER DEVICE FOR METERED DOSING OF SUPPLEMENTS TO INFANTS, naming DAVID GASPERINO, FRIDRIK LARUSSON, SHIENG LIU, NELS R. PETERSON AND DAVID J. YAGER as inventors, filed 3 FEB. 2017, which was filed within the twelve months preceding the filing date of the present application or is an application of which a currently priority application is entitled to the benefit of the filing date.

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

SUMMARY

In some embodiments, a pacifier device for metered dosing of supplement material to infants includes: a reservoir of a size and shape to contain a multi-dose supply of a supplement material; a pacifier affixed to the reservoir, the pacifier including a nipple with a conduit between the reservoir and an aperture positioned at a distal region of the nipple; a supplement metering unit positioned within the reservoir; a pressure applicator affixed to the reservoir, and configured to apply pressure against the supplement metering unit; and a controller affixed to the pressure applicator.

In some embodiments, a pacifier device for metered dosing of supplement material to infants includes: a reservoir of a size and shape to contain a multi-dose supply of a supplement material; a pacifier affixed to the reservoir, the pacifier including a nipple with a conduit between the reservoir and an aperture positioned at a distal region of the nipple; a supplement metering unit positioned between the reservoir and the pacifier element, the metering unit of a size and shape to meter out a single dose of the supplement material; a pressure applicator affixed to the supplement metering unit, and configured to apply pressure against the supplement metering unit in the direction of the pacifier; and a controller affixed to the pressure applicator.

In some embodiments, a pacifier device for metered dosing of supplement material to infants includes: a reservoir of a size and shape to contain a multi-dose supply of a supplement material; a pacifier affixed to the reservoir, the pacifier including a nipple with a conduit between the reservoir and an aperture positioned at a distal region of the nipple; a supplement metering unit; a pressure applicator affixed to the reservoir; a controller with a reversible mechanical interface to the pressure applicator, the reversible mechanical interface attached to a timer; and a switch positioned for use by a caregiver, the switch including an interface to the controller.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
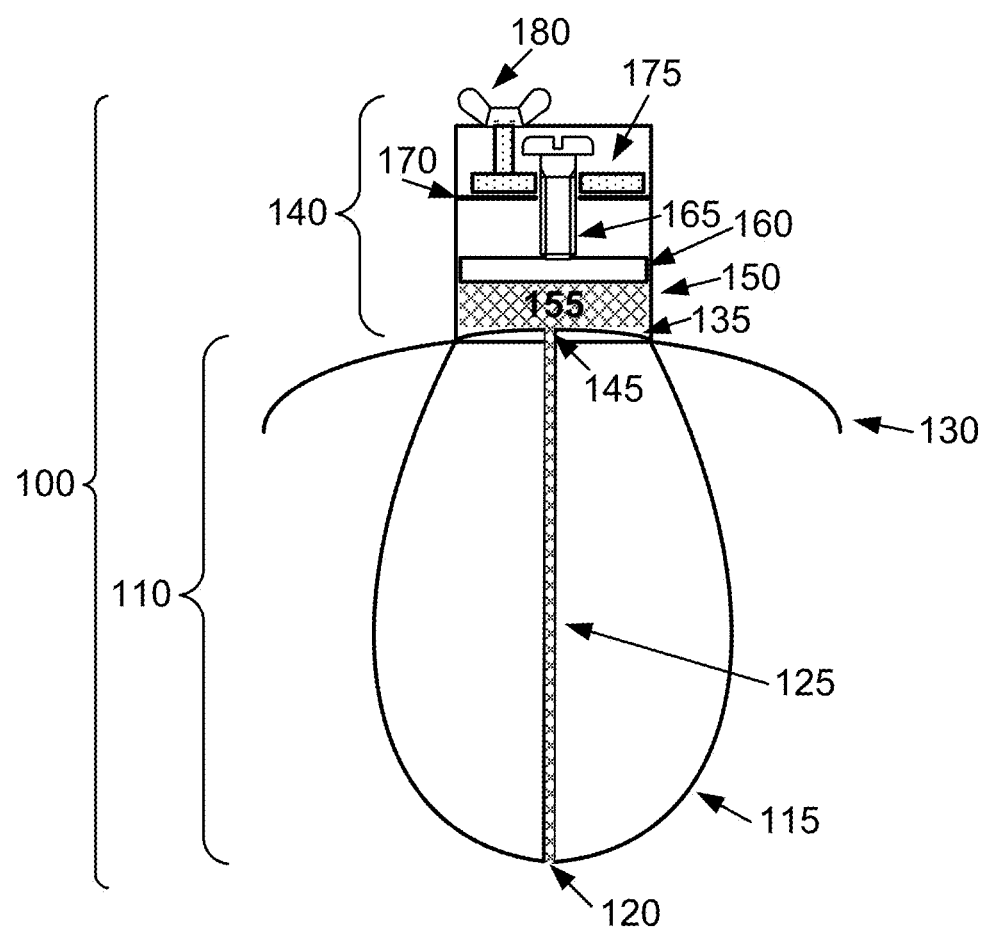
FIG. 1 is an illustration depicting aspects of a pacifier device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Pacifier devices, such as those described herein, are intended for use to provide supplement material to infants and young children. Proper nutrition during a child's early life is essential for development, and a lack of nutrition during this time can lead to chronic diseases, stunted growth, brain development abnormalities and an impaired immune system. In particular, pacifier devices can be of use to assist caregivers to provide supplemental nutrition to undernourished or malnourished children in low resource settings. The supplement material is intended for specific dosing, and either too much or too little can be undesirable. For example, some types of supplemental material are nutritional supplements including specific daily dosages of vitamins and/or minerals. Iron and vitamin A are the nutrients most commonly lacking in the diets of children in the developing world, so supplement material of interest in those locations would likely include vitamin A and iron. Accidental overdosing of these nutritional supplements can cause acute toxic effects, while under dosing can leave a child in an undernourished or malnourished state. For example, some supplement materials are nutraceuticals, and can include medicines with a specific dosage ranges and duration. Either underdoing or overdosing at specific times or through a prolonged or truncated dosage schedule could lead to ineffective or damaging effects. Some supplement material includes a combination of nutrition components and medicinal components. In some environments, it may be extremely difficult for caregivers to administer individual doses of supplement material at regular intervals over many days as desired for the health of a child. For example, doses may ideally be metered out at regular intervals of a day or less for a time period between 30 and 120 days. Maintaining such a dosage schedule may be difficult for caregivers in low resource settings with undernourished or malnourished children.

Pacifier devices, as described herein, include an internal reservoir of supplement material and control the administration of the supplemental material to a child at regular intervals for a period of weeks to months through the pacifier. While a young child sucks on the pacifier, the child is able to obtain a metered amount of the supplemental material from the pacifier. For each predetermined unit of time, for example a day, the pacifier device releases a predefined volume of stored supplement material from the reservoir within the pacifier device into the pacifier, thereby making the supplement material available for a child using the pacifier device. The child ingests the supplement material through the pacifier at that specific dose, while further use of the pacifier by the child does not elicit further supplement material during the predefined time interval. At the start of the next predefined time interval, the pacifier device releases the next predefined volume of supplement material to the pacifier, thereby providing the next dose of supplement material to the child. In some embodiments, a pacifier device includes a mechanical caregiver interface, such as a push button, dial or knob that is manipulated to provide the force to move the supplement material within the pacifier to a point of administration after the predetermined time has elapsed. In some embodiments, a pacifier device includes an electronic caregiver interface, such as a touch sensitive pad, which can provide caregiver input to release a dose within a predefined time period. In some embodiments, a pacifier device includes at least one biometric identification device positioned to identify either a caregiver or a child using the device and collect data about use of the device. A controller within the pacifier device only releases supplement material when the predetermined time period has elapsed, even if a caregiver continues to manipulate the interface.

A supplement material, as used herein, is an edible material containing nutritional and/or medicinal components, which accordingly should only be administered to an infant or small child in predefined doses over a period of time. Depending on the embodiment, a supplement material can be structured as a paste, soft solid, jelly-like texture, or a gel with sufficient stability and durability to be stored within the pacifier device for a period of time. In some embodiments, a supplement material is a liquid, such as a viscous liquid. Depending on the embodiment, a supplement material can include components such as vitamins, minerals, micronutrients, antibiotics, antimicrobials, medicinal agents, nutraceuticals, and/or salts. For example, a supplement material can be a nutritional paste material or a fortified blended food in a paste or similar form. In some embodiments, a supplement material has a daily suggested dose volume between 30 microliters and 200 microliters. In some embodiments, a supplement material has a daily suggested dose volume between 20 microliters and 250 microliters. The suggested dosage may vary depending on factors such as the medical situation of the child, the type of supplement material and its nutritional profile, the number of units of one or more active ingredient per volume of the supplement material, the age of the child, the child's medical situation, and the weight of the child. A supplement material can include a therapeutic food with specific dosage criteria for young children. For example, a supplement material can have a suggested dosage per day (24 hours), per 2 days (48 hours), per 12 hours, or per 6 hours. For example, a supplement material can have a suggested dosage schedule that is maintained for a period of days or weeks, such as daily for 1 week, 2 weeks, 3 weeks, 4 weeks, 30 days, 60 days, 90 days, 120 days or a similar time period. For example, a supplement material can have a suggested dosage volume of 50 microliters per 12 hours. For example, a supplement material can have a suggested dosage volume of 60 microliters per 12 hours. For example, a supplement material can have a suggested dosage volume of 70 microliters per 12 hours. For example, a supplement material can have a suggested dosage volume of 80 microliters per 12 hours. For example, a supplement material can have a suggested dosage volume of 50 to 100 microliters per 12 hours, depending on the age, size, medical situation and nutrition needs of an individual child.

In some embodiments, a pacifier device for metered dosing of supplement material to infants includes: a reservoir of a size and shape to contain a multi-dose supply of a supplement material; a pacifier affixed to the reservoir, the pacifier including a nipple with a conduit between the reservoir and an aperture positioned at a distal region of the nipple; a supplement metering unit positioned within the reservoir; a pressure applicator affixed to the reservoir, and configured to apply pressure against the supplement metering unit; and a controller affixed to the pressure applicator. In some embodiments, a pacifier device for metered dosing of supplement material to infants includes: a reservoir of a size and shape to contain a multi-dose supply of a supplement material; a pacifier affixed to the reservoir, the pacifier including a nipple with a conduit between the reservoir and an aperture positioned at a distal region of the nipple; a supplement metering unit positioned between the reservoir and the pacifier element, the metering unit of a size and shape to meter out a single dose of the supplement material; a pressure applicator affixed to the supplement metering unit, and configured to apply pressure against the supplement metering unit in the direction of the pacifier; and a controller affixed to the pressure applicator. In some embodiments, a pacifier device for metered dosing of supplement material to infants includes: a reservoir of a size and shape to contain a multi-dose supply of a supplement material; a pacifier affixed to the reservoir, the pacifier including a nipple with a conduit between the reservoir and an aperture positioned at a distal region of the nipple; a supplement metering unit; a pressure applicator affixed to the reservoir; a controller with a reversible mechanical interface to the pressure applicator, the reversible mechanical interface attached to a timer; and a switch positioned for use by a caregiver, the switch including an interface to the controller.

FIG. 1 illustrates aspects of a pacifier device. The pacifier device 100 shown in FIG. 1 includes a pacifier 110 that resembles a standard pacifier used to soothe a young child. The pacifier 110 includes a nipple 115 of a size and shape for placement in the mouth of a young child to permit the child to suck on the nipple 115. The nipple 115 includes a conduit 125 traversing the nipple 115. A conduit can be, for example, fabricated from a flexible plastic or silicone tubing. The conduit 125 has an end 120 on the nipple 115, for example at a distal position on the nipple 115. In some embodiments, the conduit end 120 on the nipple 115 is positioned at the end region of the nipple 115. In some embodiments, the conduit end 120 on the nipple 115 is positioned on a side, edge, top or bottom of the nipple 115. A shield 130 is positioned adjacent to the base of the nipple 115. The shield is of a size, shape and position to maintain the nipple within a child's mouth with minimal risk of swallowing the pacifier device. In some embodiments the shield contains holes or vents to permit air flow through the shield to assist in the breathing of the child.

An enclosure 140 is positioned behind the shield 130, the enclosure operably attached to the nipple 115 and the conduit 125. The enclosure includes walls of a size, shape and position to provide structure around the reservoir and other components of the device. In some embodiments, the enclosure is watertight and/or waterproof. In some embodiments, the enclosure includes a washable exterior surface. In some embodiments, the enclosure includes a hinged region, for example positioned to open a space adjacent to the reservoir for replacement, renewal or recharging of the supplement material contents within the reservoir. In some embodiments, the enclosure can be opened to renew or recharge the reservoir with additional supplement material. In some embodiments, the enclosure includes an aperture that can be covered for routine use but reversibly removed to refresh, renew or recharge the contents of the reservoir. The total size and weight of the enclosure and attached components should be minimal, to ensure that the size and weight does not impact the use of the pacifier device by a young child. The weight of the enclosure and attached components should not, for example, be sufficient to pull the pacifier nipple from the mouth of a child who is using the pacifier device.

In the embodiment illustrated in FIG. 1, the enclosure 140 includes a reservoir 150 of a size and shape to contain a multi-dose supply of a supplement material 155. In the illustrated embodiment, the reservoir 150 is positioned between the supplement metering unit 135 and the pressure applicator. The reservoir has a maximum internal volume suitable to contain the amount of supplement material for the expected series or set of dosages, for example dosages suitable for a week, 2 weeks, 3 weeks, 4 weeks, 30 days, 60 days, 90 days, 120 days, one month, 2 months or 3 months. This may include between 7 and 240 doses of the supplement material, depending on the expected administration and time period. In some embodiments, the reservoir has an internal volume sufficient to store between 5 to 15 mL of supplement material. In some embodiments, the reservoir has an internal volume sufficient to store between 2 to 10 mL of supplement material. In some embodiments, the reservoir has an internal volume sufficient to store between 5 to 20 mL of supplement material.

A supplement metering unit 135 is positioned between the reservoir 150 and the pacifier 110. In some embodiments a supplement metering unit has the ability to meter a reduced or insufficient dose, and return to a predefined full dose on the next cycle. In some embodiments, the supplement metering unit includes a flexible membrane with sufficient elasticity to deform under pressure from the pressure applicator to release a dose of supplement material into the conduit of the pacifier. A supplement metering unit can be formed, for example, from a silicone or soft plastic material. The supplement metering unit 135 shown in FIG. 1 includes an aperture 145 positioned adjacent to the end of the conduit 125 of the pacifier 110. The aperture can be a self-sealing aperture, formed as a slit or similar structure in the membrane, the aperture of a size and shape to open and permit a dose of the supplement material through the aperture in response to pressure transmitted from the pressure applicator. In some embodiments, the aperture is a circular orifice small enough to self-close at the appropriate time during use. During use, when the pressure plate 160 pushes on the supplement material 155 within the reservoir 150, a supplement metering unit 135 formed as a flexible membrane bends or deforms sufficiently to permit a dose of supplement material through the aperture 145 into the conduit 120. After the dose is transmitted, the pressure eases on the supplement metering unit 135 and it returns to a position wherein the aperture 145 is closed. The supplement metering unit intended for use with the device 100 has sufficient stiffness to return to its original conformation when the pressure is released by dispensing a dose of supplement material. Similarly, an aperture in a membrane will close when the membrane de-flexes and returns to its normal configuration.

In the embodiment illustrated in FIG. 1, a pressure applicator is affixed to the reservoir 150 and configured to apply pressure against the reservoir 150 in the direction of the supplement metering unit 135. In some embodiments, the pressure applicator includes a pressure plate 160 positioned to transmit force against the interior volume of the reservoir 150 and/or the supplement material 155 within the reservoir 150. A pressure plate 160 can include an external surface that reversibly mates with an interior surface of the reservoir 150, so that the pressure plate provides even pressure along a surface of the supplement material 155 within the reservoir 150. The pressure plate 160 illustrated in FIG. 1 is attached to a screw mechanism 165 which is secured in place with a frame 170. The screw mechanism 165 is of a size, shape and position to transmit pressure against the pressure plate 160 when turned. In some embodiments, a pacifier device includes an auger-type mechanism (e.g. see FIG. 2) or another mechanism positioned to transmit pressure against supplemental material within a reservoir.

A controller is positioned adjacent to the pressure applicator, the controller configured to permit the pressure applicator to operate only at predefined time intervals, e.g. according to the dose schedule for a specific supplement material. A controller can be a mechanical controller. A controller can be an electronic controller. A controller can include both mechanical and electronic components. In some embodiments, the controller includes an electronic clock. In some embodiments, the controller is predominately mechanical and includes a timer configured to connect the pressure applicator to a user interface mechanism only at predetermined time intervals. A user interface is attached to the controller. In some embodiments, the user interface is a mechanical feature, for example a gear or a lever. In some embodiments, the user interface is a button or tab, which can be electronic or mechanical. A user interface can be configured to permit a user (e.g. an adult caretaker) to release a dose of the supplement material into the nipple at predefined time intervals and not at additional time points. For example, a controller can include a timer that only permits control of the system by a user interface once during a predefined time period. For example, a controller can include a timer that only permits control of the system by a user interface once after a predetermined time period, for example once after a predetermined time period has elapsed.

For example, FIG. 1 illustrates the mechanical gears of controller 175 interfacing with both the dial-like user interface 180 and the screw mechanism 165 of the pressure applicator. In the illustrated embodiment, when the preset time interval has not elapsed since the last transmission of mechanical energy from the user interface 180 and the pressure applicator, the gears of the controller 175 physically disengage from the pressure applicator. In the absence of a connection between the controller and the pressure applicator, the pressure applicator does not push a dose of the supplement material against the supplement metering unit and further into the conduit.

Some embodiments include an indicator, such as a LED light or sound emitter, attached to the controller and positioned adjacent to the user interface. For example, a LED light may be operably attached to the controller so that the LED light illuminates when the time period has elapsed and a user may manipulate the user interface in order to cause a dose of the supplement material to be extruded. For example, a sound emitter may be operably attached to the controller so that the sound emitter plays a note or other sound when the time period has elapsed and a user may manipulate the user interface in order to cause a dose of the supplement material to be extruded. For example, a LED light may be operably attached to the controller so that the LED light illuminates when the time period has not elapsed and a user may manipulate the user interface, but that manipulation is physically disconnected from the pressure applicator and/or the supplement metering unit so that a dose of the supplement material is not extruded. In some embodiments, an indicator is a mechanical indicator such as a mechanism that emits a click or similar noise. In some embodiments, an indicator is an electronic indicator such as a LED or electronic sound emitter. In some embodiments, an indicator is a Bluetooth low energy unit, sending a signal to an associated device at a distance.

Figure 2:
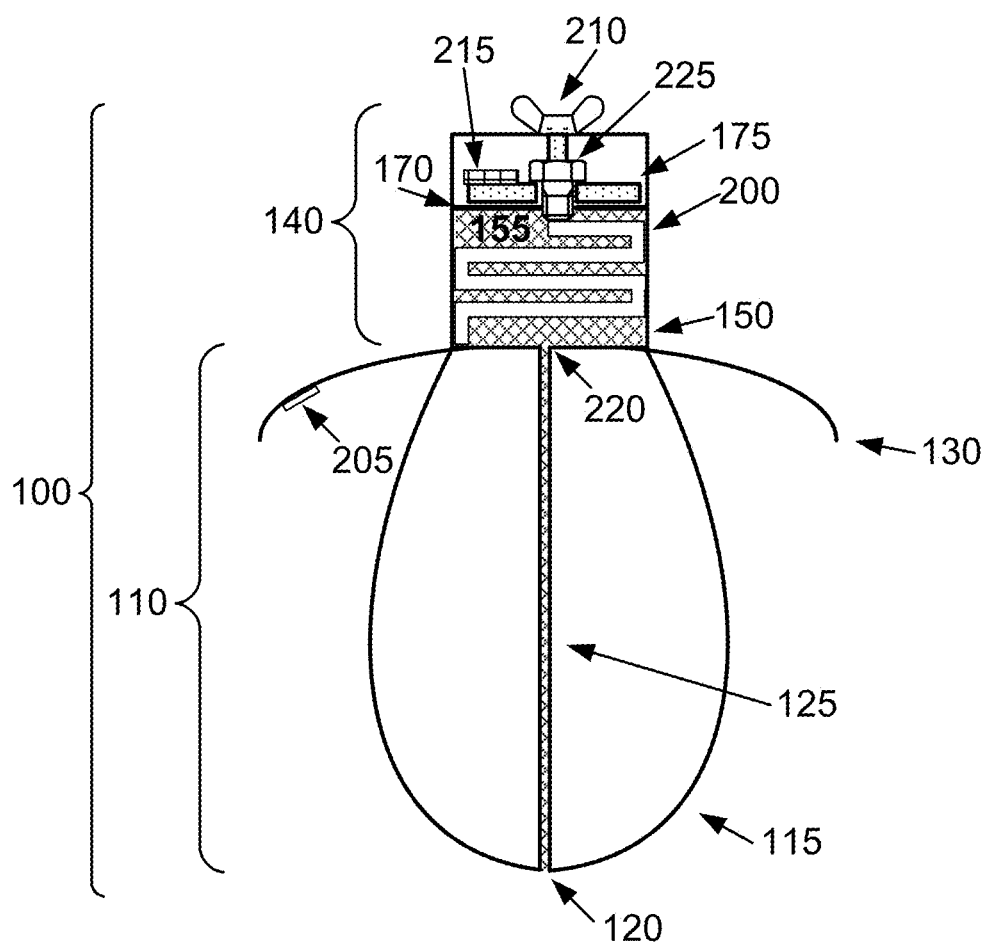
FIG. 2 is an illustration depicting aspects of a pacifier device.

FIG. 2 illustrates aspects of a pacifier device. The pacifier device 100 includes a pacifier 110 including a nipple 115 with a conduit 125 traversing the nipple 115. A shield 130 is positioned adjacent to the base of the pacifier 110. The conduit 125 has an aperture 120 positioned at a site distal to the shield 130. An enclosure 140 is positioned at the reverse side of the shield 130 and centered relative to the shield 130. A reservoir 150 contains multiple doses of a supplement material 155. In the embodiment illustrated, a supplement metering unit includes an auger-type conveyer 200. In some embodiments, a supplement metering unit includes a rotating helical screw blade. In some embodiments, a supplement metering unit includes a progressive cavity pump, an eccentric screw pump or a cavity pump. The auger or similar device is of a size, shape and position so that a predetermined rotation of the auger or blade moves a dose of supplement material through the aperture 220 at the base of the reservoir 150 into the conduit 125 for dispensation through the distal aperture 120 while a child is using the pacifier 110. For example, some embodiments include an auger-type conveyer 200 of a size and shape as well as position relative to the aperture 145 to move a single dose of supplement material 155 thought the aperture 145 into the conduit 125 for each complete rotation of the auger-type conveyer 200. For example, some embodiments include a rotating helical screw blade of a size and shape as well as position relative to the aperture in the reservoir to move a single dose of supplement material thought the aperture into the conduit of the nipple for each complete rotation of the rotating helical screw blade. In some embodiments, a rotating auger or screw blade also seals a unit of supplement material that is a single dose from a subsequent does. This physical separation can, for example, prevent drying out of the remaining supplement material within the reservoir.

In the embodiment illustrated in FIG. 2, the auger-type conveyer 200 is attached to the user interface 210 through a screw mechanism 225 of the pressure applicator. The screw mechanism 225 is held in position against an interior of walls of the enclosure by connection with a frame 170. A controller 175 is connected to the screw mechanism 225 at the reverse side of the frame from the reservoir 150. The embodiment includes an electronic communications unit 215 operably attached to the controller 175. For example some embodiments include an electronic communications unit enabled with Bluetooth and attached to an electronic controller. An electronic communications unit can be configured to respond to an external query, for example to send a report as to the number of doses that have been dispensed from a pacifier device in a certain period of time (e.g. since the last report, or within the last week or month).

FIG. 2 also illustrates a sensor 205 attached to a side and position of the shield 130 expected to have contact with the face of a young child when the pacifier device 100 is in use. In some embodiments, the sensor is a capacitance sensor that is connected to an electronic controller. A capacitance sensor can, for example, be configured to send information to an attached controller relative to use and the length of use of a pacifier device. In some embodiments, the sensor is a temperature sensor or a pressure sensor. Data regarding information from a sensor can be sent via an electronic communications unit. Ideally, the sensor should be small and lightweight in order to not impede use of the pacifier by a small child.

Figure 3:
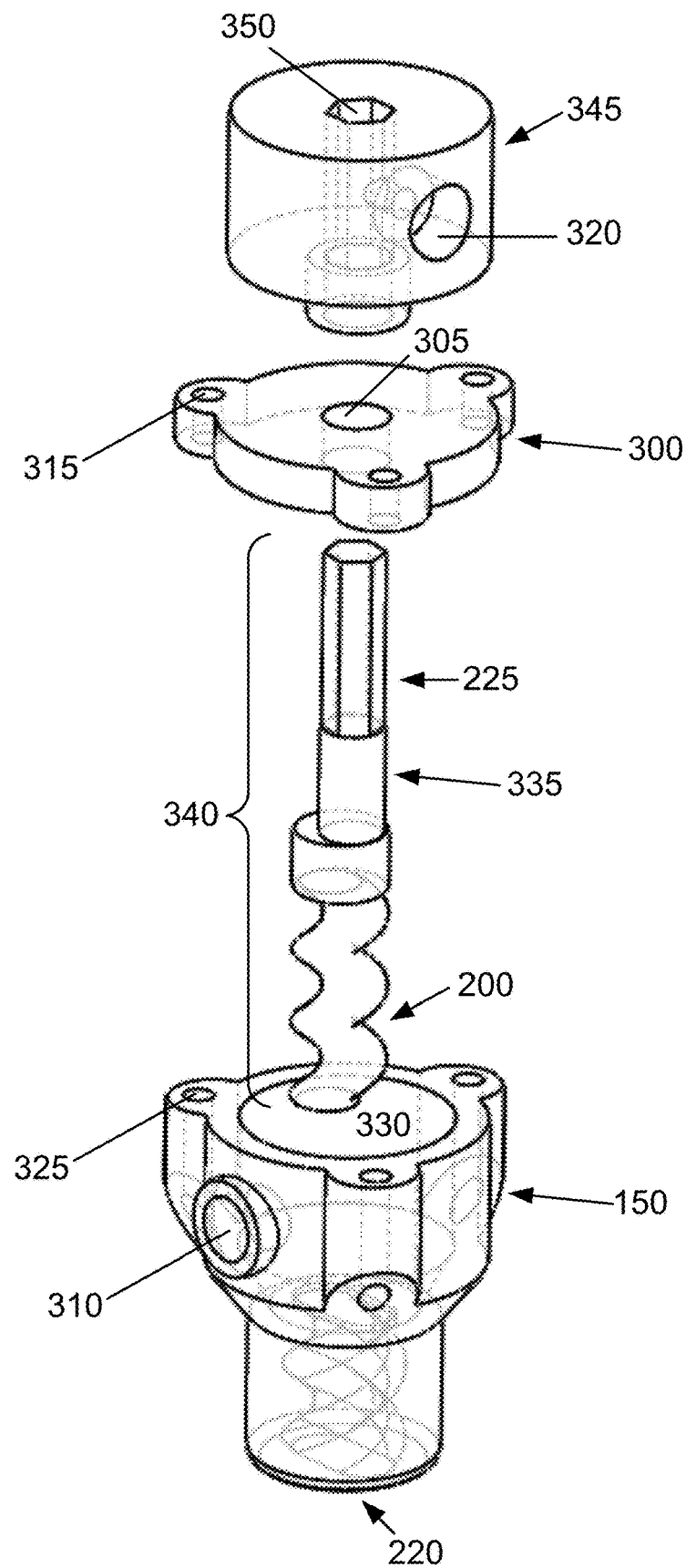
FIG. 3 is an illustration depicting a mechanical interface of a pacifier device.

FIG. 3 depicts aspects of components of an embodiment of a pacifier device including a supplement metering unit with an auger-type conveyer. The components of the device are illustrated separately in FIG. 3 for clarity. The device includes a reservoir 150 including an interior volume 330 of a size and shape to contain a series of dosages of a supplement material. The reservoir 150 has exterior walls with an aperture 220 of a size, shape and position to dispense a metered dose of the supplement material from the interior volume 330 of the reservoir 150. The reservoir 150 includes a charge aperture 310 of a size, shape and position to add, refill, or recharge supplemental material into the interior volume 330 of the reservoir 150. The charge aperture can include a cover, for example a reversibly attachable cover.

A shaft 340 includes 3 sections, forming a screw mechanism 225 on a first end, an auger-type conveyer 200 on a second end and a connecting region 335 in between. The auger-type conveyer 200 is of a size and shape to fit within the interior of the reservoir 150 and to force a specific quantity of supplement material to the aperture 220 when the auger 200 is rotated. During use, the shaft 340 is rotated around its long axis to dispense appropriate volumes of supplement material from the reservoir 150 into the conduit of the pacifier. The shaft 340 is rotated by a caregiver through a user interface, such as a knob or dial. A controller permits the rotation in limited amounts and in predetermined time intervals as appropriate to dispense dosage volumes of the supplement material.

In the embodiment illustrated in FIG. 3, the reservoir 150 includes a detachable cover 300. The detachable cover 300 includes a central aperture 305 of a size, shape and position to permit the shaft 340 to traverse the aperture 305. The interior surface of the aperture 305 is of a size and shape to reversibly mate with an exterior surface of the connecting region 335 of the shaft 340. Fastening regions 315 are positioned at the edges of the cover 300, the fastening regions 315 of a size, shape and position to mate with the fastening regions 325 in the reservoir 150. For example, the cover 300 can be fastened to the reservoir 150 with screws or similar fasteners using the fastening regions 315, 325.

FIG. 3 further depicts a controller component 345. The controller component 345 includes a central aperture 350 with an internal surface of a size, shape and position to reversibly mate with the exterior of the screw mechanism 225 of the shaft 340. The exterior of the screw mechanism 225 and the central aperture 350 are shaped so that they do not move relative to each other, in other words they are shaped to not have sliding surfaces relative to each other. For example, in the illustrated embodiment, the screw mechanism 225 and the central aperture 350 both have a mating hexagonal shape in cross-section. The controller component 345 also includes an aperture 320 for a control element that makes contact with the exterior of the screw mechanism 225 and prevents the shaft 340 from rotation to control the time of dosing of the supplement material. In some embodiments the aperture 320 includes an interior threaded surface that is of a size, shape and position to reversibly mate with a screw (not shown in FIG. 3).

Figure 4:
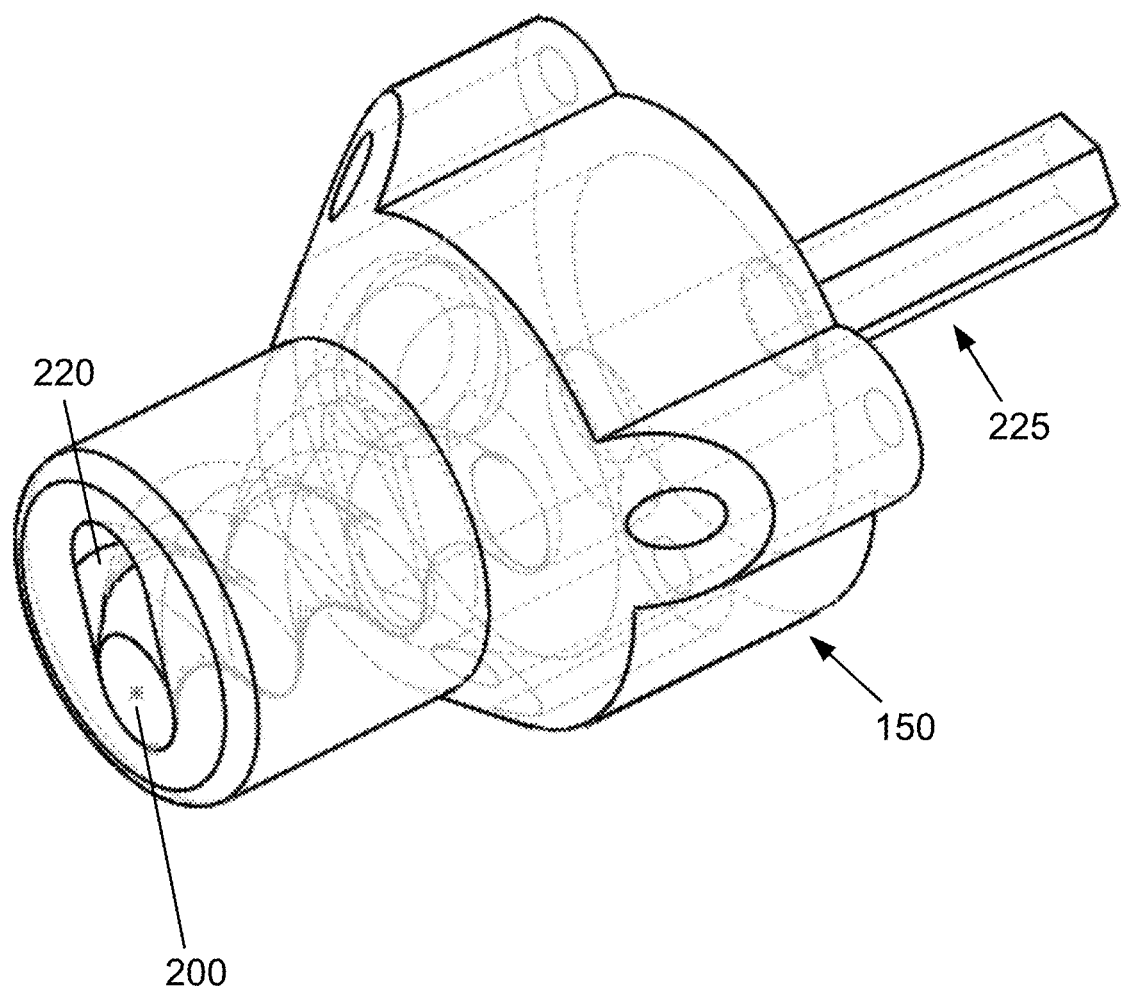
FIG. 4 is an illustration depicting aspects of a pacifier device.

FIG. 4 illustrates aspects of components of an embodiment of a pacifier device including a supplement metering unit with an auger-type conveyer, similar to those shown in FIG. 3. In the view of FIG. 4, components are fitted together to show their relationship in a final device more specifically. The reservoir 150 is illustrated at an angle so that the screw mechanism 225 of the shaft is projecting from the right side of the reservoir 150. The end of the auger-type conveyer 200 is shown within the aperture 220 in the visible end of the reservoir to the left side of the illustration. In the pacifier device, the aperture 220 would be positioned adjacent to the end of a conduit traversing the nipple of the pacifier. In some embodiments, aperture 220 is aligned with the end of a nipple so that supplement material can be directly extruded.

Figure 5:
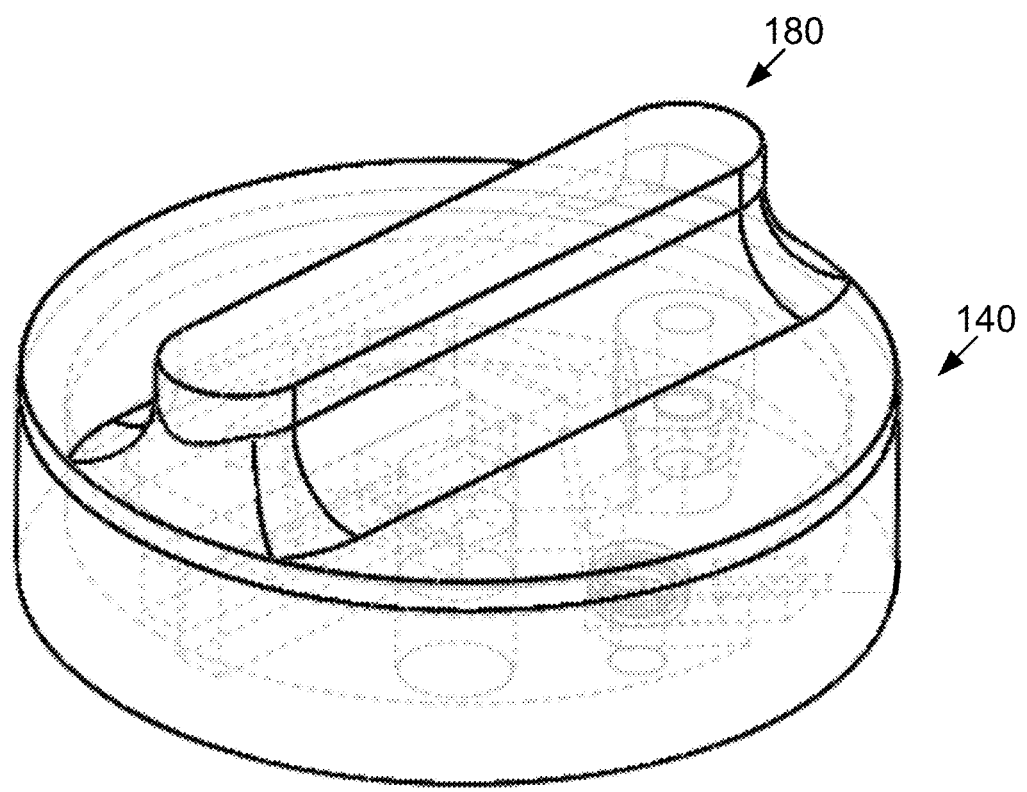
FIG. 5 is an illustration depicting aspects of a pacifier device.

FIG. 5 illustrates a user interface 180 projecting from a partial view of an enclosure 140 of a pacifier device. The user interface 180 is formed as an elongated knob that can be turned to transmit force into the supplement metering unit inside the enclosure 140. During use, the dial of the user interface could be turned by a caregiver to provide a dose of supplement material within a pacifier device. The internal control mechanism of the pacifier device would, however, only enable dosing once during a predetermined time period, for example once per 24 hours.

Figure 6:
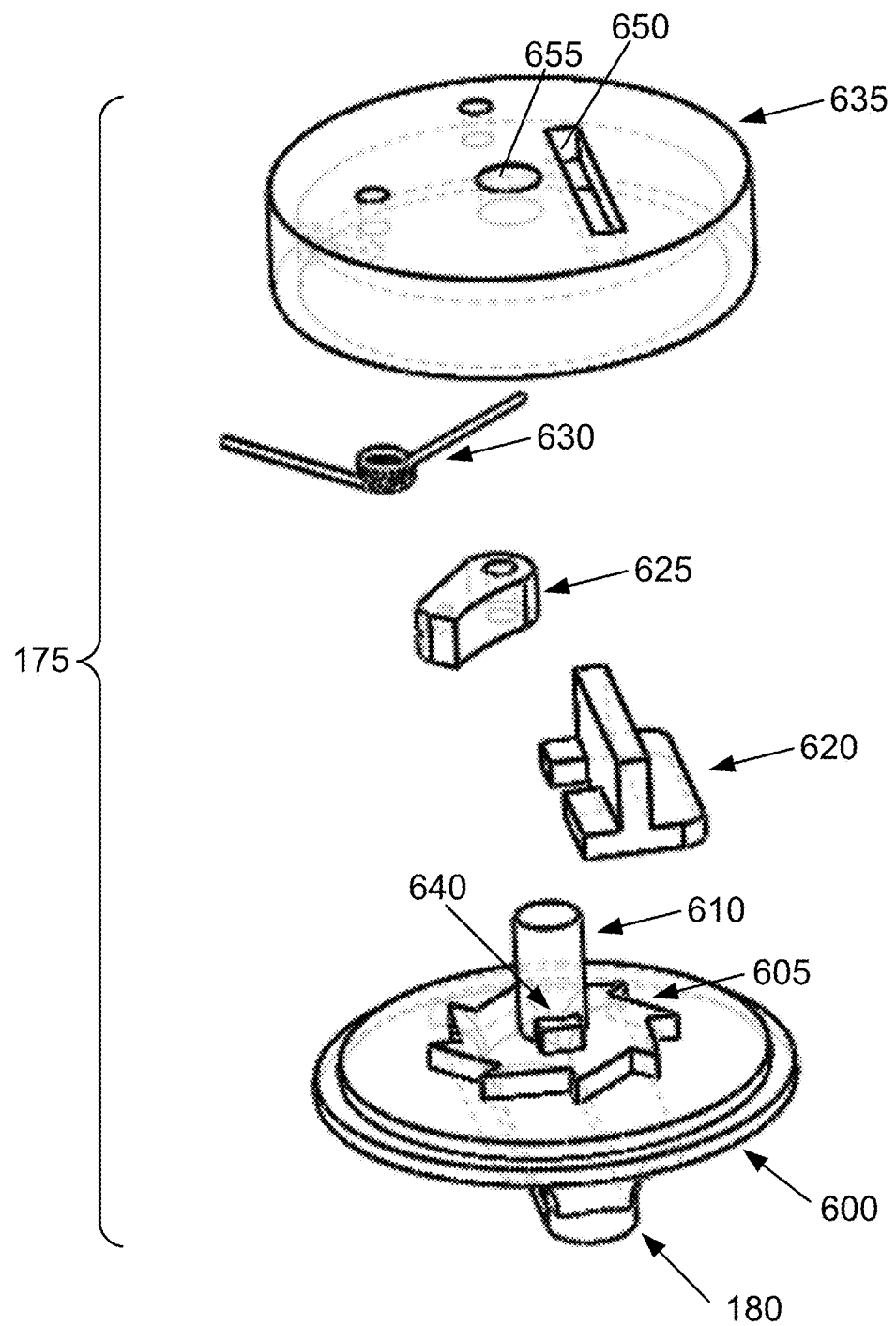
FIG. 6 is an illustration depicting aspects of a pacifier device.

FIG. 6 illustrates components of an embodiment of a controller. In the illustrated embodiment, the controller is a mechanical controller. Some embodiments include an electronic controller or a controller with both mechanical and electronic components. The controller 175 is positioned against a wall 600 of the enclosure of the pacifier device. The controller 175 connects to the user interface 180 through the wall 600. An axle 610 is connected to the user interface 180 through an aperture in the wall 600. The axle 610 is attached to a gear 605 positioned adjacent to the interior surface of the wall 600, so that the axle 610 and gear can rotate. A stop 640 is affixed to the side of the gear 605. The controller 175 includes a slide 620 with a gap 645 in one side. The controller 175 includes a ratchet 625 and a positioner 630. When the pacifier device is assembled, the controller 175 components are secured with a support 635. The support 635 includes a rectangular aperture of a size, shape and position to operably encircle the top edge of the slide 620 and permit motion of the slide 625 along its lone axis. The support 635 also includes a central aperture 655 of a size, shape and position to operably encircle a region of the axle 610.

Figure 7:
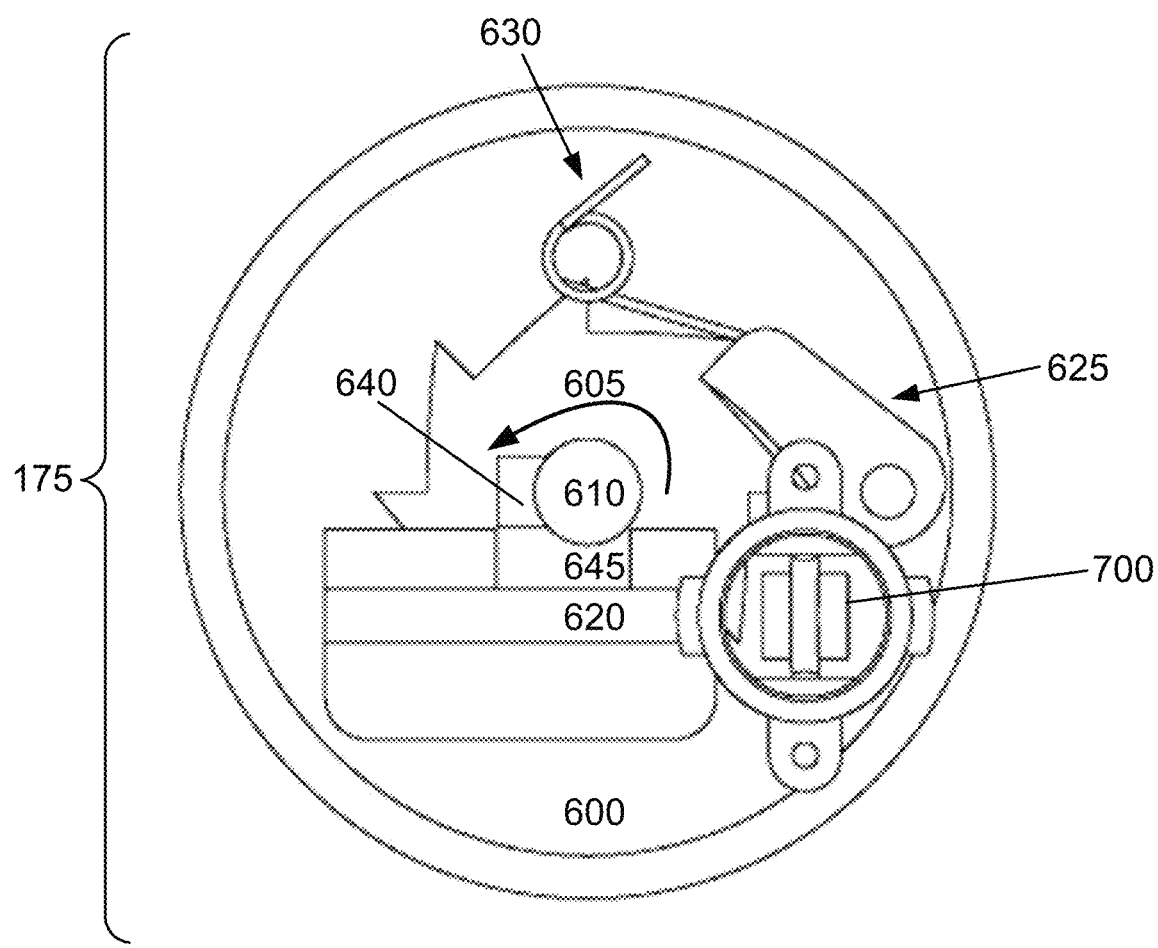
FIG. 7 is an illustration depicting aspects of a pacifier device.

FIG. 7 depicts aspects of a controller 175 with components similar to the ones shown in FIG. 6. In FIG. 7, the components are illustrated in an orientation as they would be in an assembled pacifier device. When a user, for example a child's caregiver, turns an attached user interface such as a knob or dial (see, e.g. FIGS. 5 and 6) the motion turns the attached axle 610 against a surface of the portion 600 of the enclosure. The attached gear 605 interfaces with the ratchet 625 to permit the axle 610 to turn only in one direction (e.g. counter-clockwise in the view of FIGS. 7 and 8). A positioner 630 secures the ratchet 625 against the gear 605. As the axle 610 turns, the attached stop 640 also turns until it is within the gap 645 in the slide 620. The slide 620 can be moved back and forth along its long axis (left and right in the view of FIG. 7). The slide 620 is moved from a rotating position (farther to the left as shown in FIG. 7) by motion of the stop 640 around the axis 610. The slide 620 is moved from the rotating position shown in FIG. 7 to a blocking position (i.e. farther to the right as shown in FIG. 8) by the motion of the stop 640, which also stops rotation of the axle 610.

In the view illustrated in FIG. 7, the slide 620 is positioned so that the stop 640 attached to the axle 610 can move into the gap 645 in the slide 620. The slide 620 is in a first position. This permits the axle 610 to be turned by a user one rotation until it is unable to turn as the stop 640 within the gap 645 prevents further rotation as the slide 620 is pushed to a second position (see FIG. 8). In this embodiment, a single rotation as permitted by the device is sufficient for a single dose to be dispensed. For example the axle 610 can be attached to an auger-conveyer system as illustrated in FIGS. 2, 3, and 4.

A slide controller attached to the controller of the device is positioned to move the slide back to a position to allow rotation of the axle and dispensation of an additional dose of supplement material. The action of a slide controller can be controlled by a timer. For example, a slide controller with an attached timer can be calibrated to reset the position of the slide every 24 hours. A slide controller can be mechanical, electronic, or a combination of mechanical and electronic elements. The slide controller 700 illustrated in FIG. 7 is a mechanical controller positioned to move the slide 620 along its long axis into a position permissive for a dose of supplement material to be dispensed (from right to left in the view of FIG. 7). In some embodiments, the slide controller includes a timer. In some embodiments, the slide controller is operably attached to a timer. The timer can be a mechanical or an electronic timer.

Figure 8:
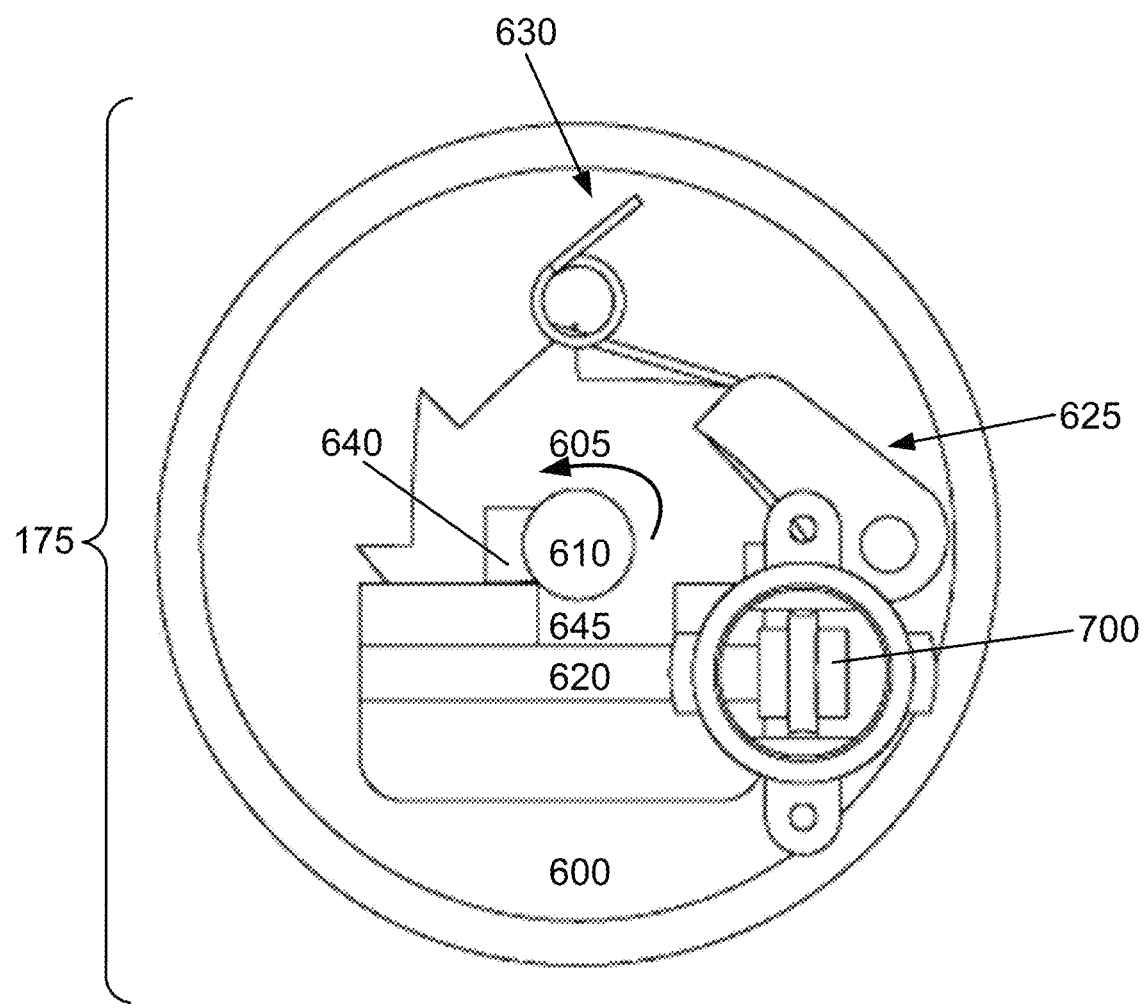
FIG. 8 is an illustration depicting aspects of a pacifier device.

FIG. 8 illustrates an embodiment similar to the one of FIG. 7 after the slide 620 has moved to a second, blocking position from the rotation of the stop 640 in the gap 645, and the stop 640 affixed to the axle 610 is preventing the axle 610 from turning further due to the position of the slide 620. In this position, a user would be unable to turn the user interface knob or dial in either direction, since the ratchet 625 interacting with the gear 605 prevents the axle 610 from turning in the opposing direction from the usual counter-clockwise movement. After the predetermined time for a dose of supplement material has passed, the slide controller 700 will push the slide 620 back to the rotating position and the gap 645 will be in a position to accept the stop 640 as the axle 610 turns. This will release another dose of the supplement material into the conduit of the attached pacifier.

Pacifier devices, as used herein, are devices that are designed for infants and small children to suck on. During use, the pacifier device provides a specific dose of a nutritional supplement material per unit of time to the child. Pacifier devices are mainly intended for use by infants and small children in the complementary feeding stage, approximately 6 months of age to 2 years of age, when children are not primarily relying on mother's milk for nutrition.

In some embodiments, a pacifier device has an external appearance like a common pacifier, with the device primarily being made up of the nipple portion. In some embodiments, a pacifier device has an elongated portion opposite to the nipple, with an appearance like an infant feeding bottle. In some embodiments, a pacifier device is configured as a table top dispenser.

Figure 9:
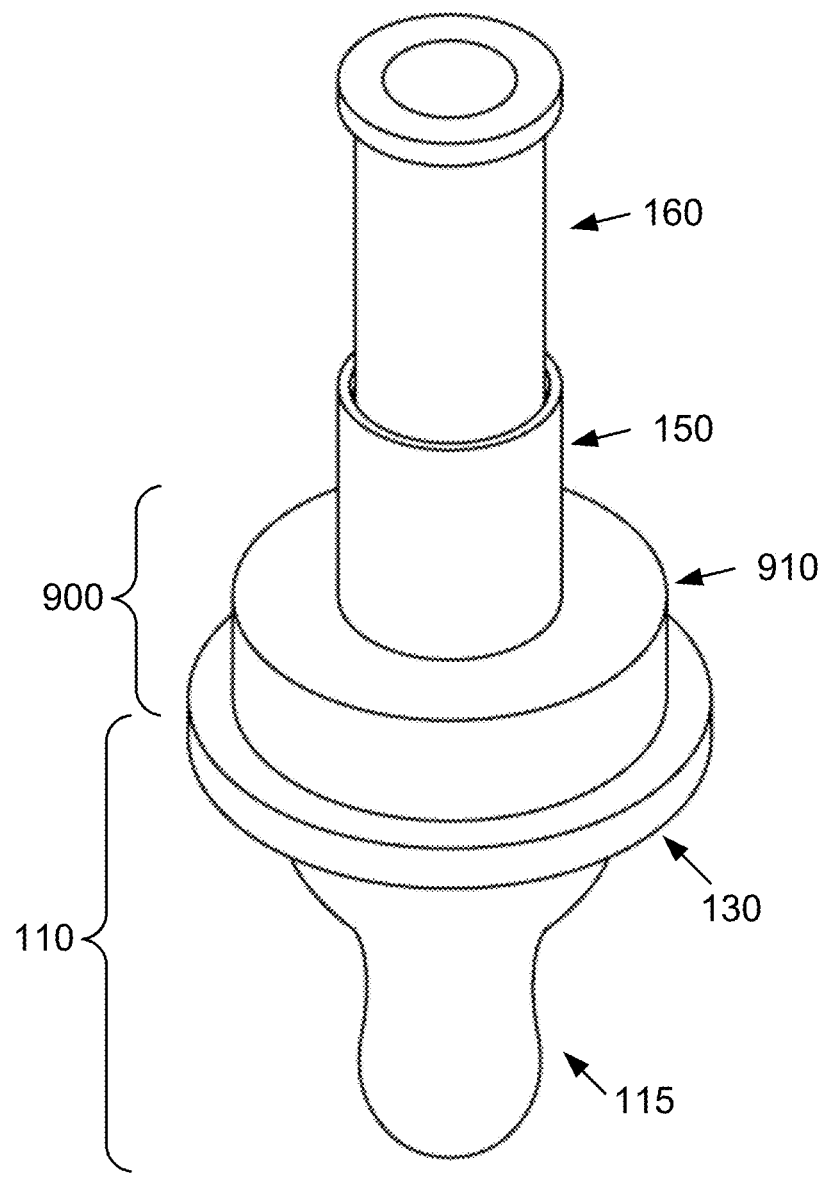
FIG. 9 is an illustration depicting aspects of a pacifier device.

FIG. 9 illustrates aspects of a pacifier device. The pacifier device shown in FIG. 9 has had portions removed to better display internal features. The pacifier device includes a reservoir 150. The reservoir 150 includes a multi-dose supply of a supplement material positioned within the interior of the reservoir 150. In the illustrated embodiment, the reservoir has a hollow cylinder shape, with the hollow interior of a size to contain a multi-dose supply of a supplement material. In some embodiments, the reservoir is of a size and shape to enclose between 30 and 90 doses of a supplement material. For example, the hollow interior can contain a 30 day supply of single daily doses. For example, the hollow interior can contain a 60 day supply of single daily doses. For example, the hollow interior can contain a 90 day supply of single daily doses. For example, the hollow interior can contain a 30 day supply of twice daily doses. For example, the hollow interior can contain a 60 day supply of twice daily doses. For example, the hollow interior can contain a 90 day supply of twice daily doses. In some embodiments, the supplement material is a paste material. In some embodiments, the supplement material is a gel material. In some embodiments, the supplement material is a liquid material. A supplement material which is liquid can be a thickened or viscous liquid. During use of the device, pressure is exerted on the supplement material within the reservoir 150 with a pressure applicator 160.

The reservoir 150 of the pacifier device shown in FIG. 9 is positioned within a base 900. The base 900 positions and orients the reservoir 150 relative to the pacifier 110 and the pressure applicator 160. The base 900 includes a holder 910, the holder 910 of a size, shape and position to fix the position of the reservoir 150 in relation to the pacifier 110. The holder 910 maintains the position of the reservoir 150 during use, including when pressure is exerted along the length of the reservoir 150 by the pressure applicator 160. The holder 910 extends partially along the outer walls of the exterior of the reservoir 150. In some embodiments, when it is desirable to remove and replace a reservoir, the reservoir can be removed directly from the holder and a new reservoir can be inserted within the device. In some embodiments, the reservoir is configured to be removable and replaceable. In some embodiments, the reservoir is configured to be refilled, either in place within the device or after removal from the device, and reused.

A shield 130 is positioned at the lower surface of the base 900, adjacent to a base of the nipple 115. The nipple 115 includes an internal conduit and an aperture at the distal tip to extrude supplement material from the nipple and into the mouth of a child using the pacifier device. The conduit within the nipple is affixed at a first end to a position adjacent to the reservoir, and the second end is adjacent to the distal end of the nipple, in a position which is within a child's mouth during use of the pacifier device. In some embodiments, a supplement metering unit is positioned adjacent to the end of the conduit at the base of the nipple. In some embodiments, a supplement metering unit is positioned adjacent to the end of the conduit at the distal end of the nipple.

Figure 10:
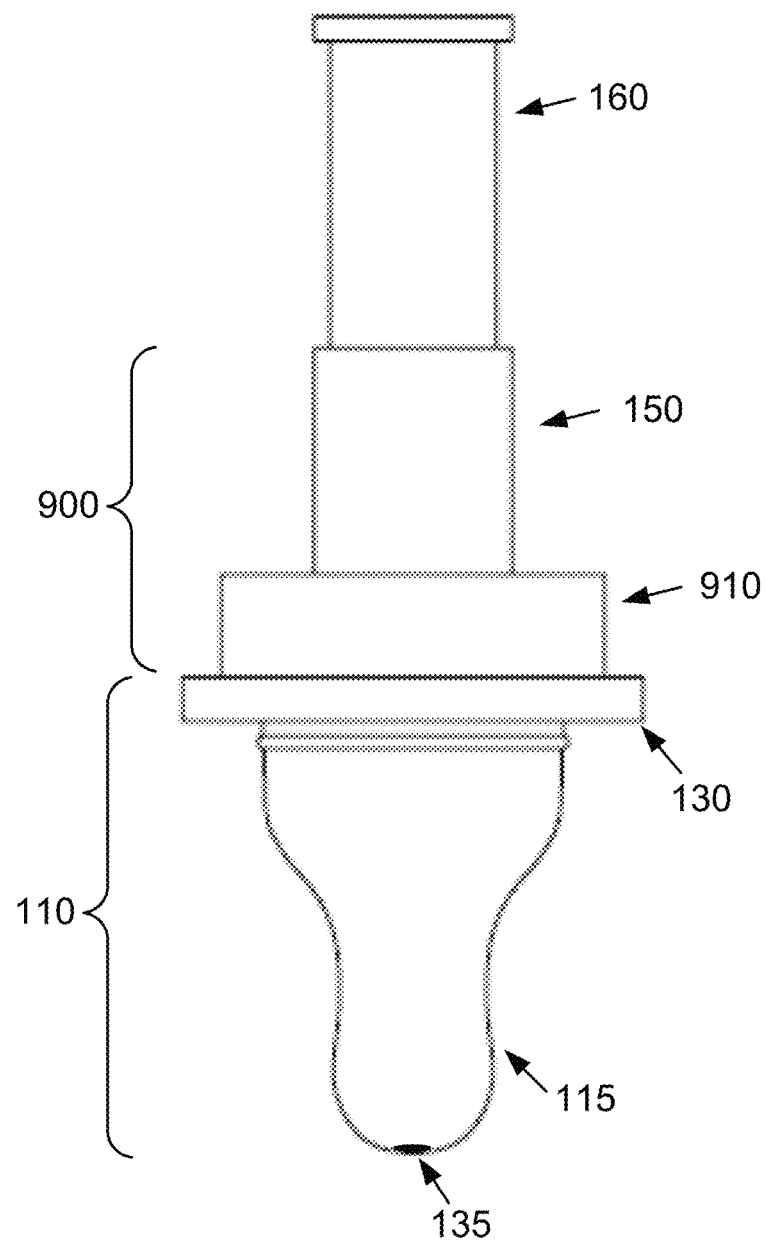
FIG. 10 is an illustration depicting aspects of a pacifier device.

FIG. 10 depicts a partial pacifier device similar to the one shown in FIG. 9, from a side view. The pacifier device includes a reservoir 150 positioned partially within a holder 910. The holder 910 encircles the lower portion of the reservoir 150 and maintains the position of the reservoir relative to a conduit (not shown) traversing the long axis of the nipple 115 of the pacifier 110. The conduit within the nipple 115 has a distal end with an aperture in the distal tip of the nipple 115, the aperture including a supplement metering unit 135 that selectively opens in response to pressure along the length of the conduit. Although dosing requirements depend on the supplemental material used and the medical needs of a specific child, the size and shape of the conduit and the supplement metering unit 135 are selected to permit a metered dose of the supplement material to be dispensed to a child during the routine use of a pacifier device. The volume of the dosage is based on the action of the pressure applicator in response to the time-based metering of the controller, while the flow rate through the conduit and supplement metering unit can control rate of flow to a child's mouth. The size and shape of the conduit and supplement metering unit can be selected based on factors such as the dosing requirements of a supplement material, the viscosity and thickness of that supplemental material, and the desired rate of ingestion of a dose of supplement material for a child. In some embodiments the conduit and/or supplement metering unit may be fabricated to permit passage of a material (e.g. fabricated from a hydrophobic or hydrophilic material).

A shield 130 is positioned adjacent to the base of the nipple 115. At the opposing side to the nipple 115, the shield 130 is affixed to the base 900. The shield is of a size and shape to prevent a child using the device from pulling it into the mouth too deeply, thereby minimizing the potential for a choking hazard. In some embodiments the shield is co-extensive with the dimensions of the base at the face adjacent to the nipple. In some embodiments the shield extends beyond the dimensions of the base at the face adjacent to the nipple. Base 900 includes the holder 910. In some embodiments the external surface of the base includes a screw thread of a size and shape to reversibly mate with a corresponding screw thread on the interior surface of an enclosure. In some embodiments the external surface of the base includes a screw thread of a size and shape to reversibly mate with a corresponding screw thread on the interior surface of a securing element (see, e.g. FIG. 13).

Figure 11:
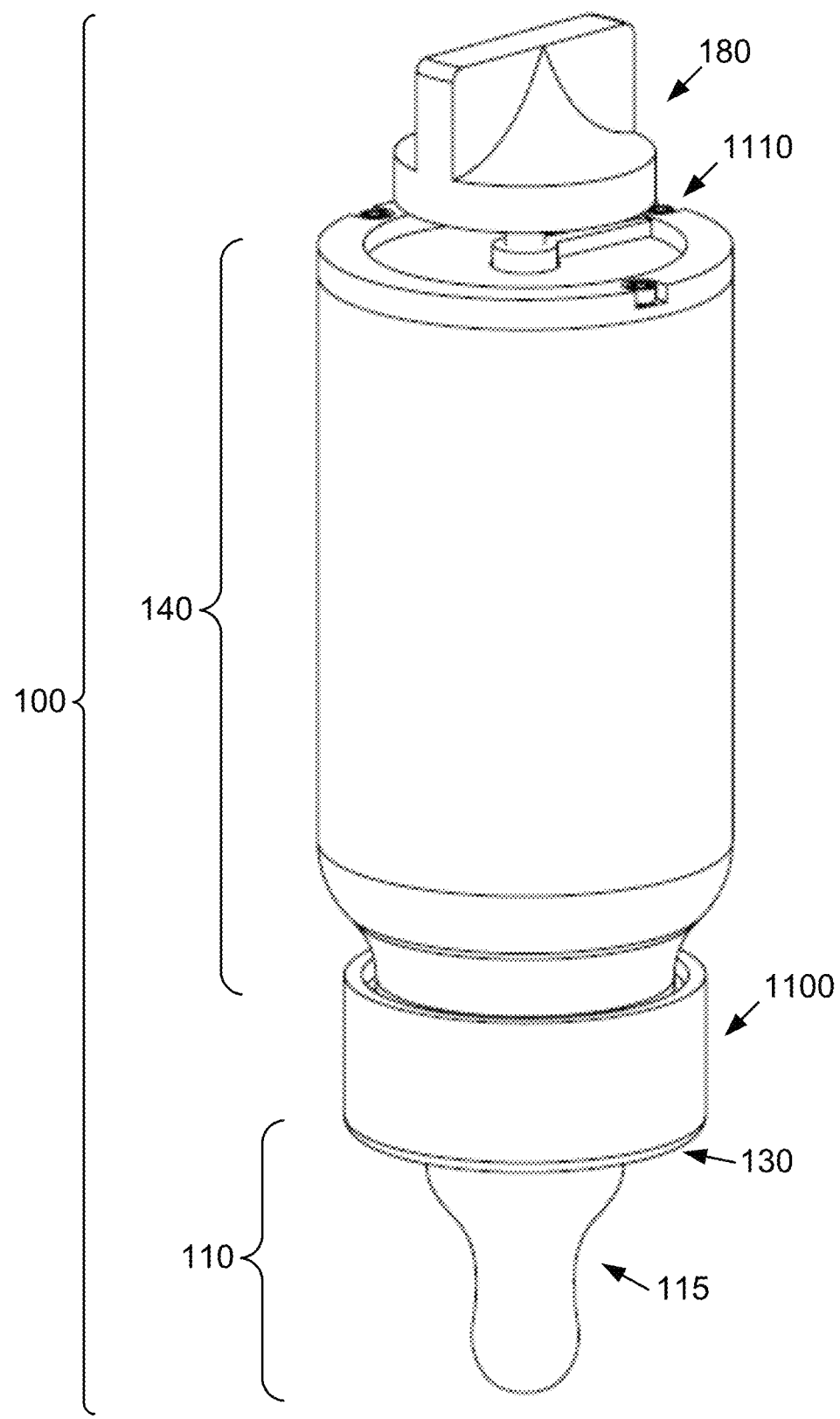
FIG. 11 is an illustration depicting aspects of a pacifier device.

FIG. 11 depicts a pacifier device 100. The embodiment of a pacifier device 100 depicted in FIG. 11 includes an enclosure 140 that is of a size and shape to be held by a child and/or an adult caregiver during use of the device 100. In some embodiments, the exterior of the enclosure can be configured to be easily cleaned. For example, the exterior can be fabricated from a plastic material with a surface that can be easily cleaned by a caregiver.

The pacifier device 100 shown in FIG. 11 includes a pacifier 110 with a nipple 115 and a shield 130 positioned adjacent to the base of the nipple 115. A securing element 1100 surrounds the exterior of the enclosure as well as the base within the device 100. The shield 130 is affixed to the surface of the securing element 1100 adjacent to the base of the nipple 115. At the opposing end from the nipple 115, a user interface 180 is affixed to the enclosure 140. The user interface 180 is operable as a dial. Internal to the device 100 is a controller which is attached to the user interface and controls action of the user interface, and a timer attached to the controller. The embodiment of a device 100 illustrated also includes a reset pin 1110 which is part of a switch that can be used to reset the timer after a set period of time has elapsed (e.g. a 24 hour dosing period). In some embodiments, a switch is integrated into a user interface configured as a dial, so that the action of the dial movement acts as a switch on the timer and resets the device after a period of time has elapsed. For example the first portion of motion of a dial can move a switch attached to the timer, thereby resetting the timer for a new time interval for dosing.

Figure 12:
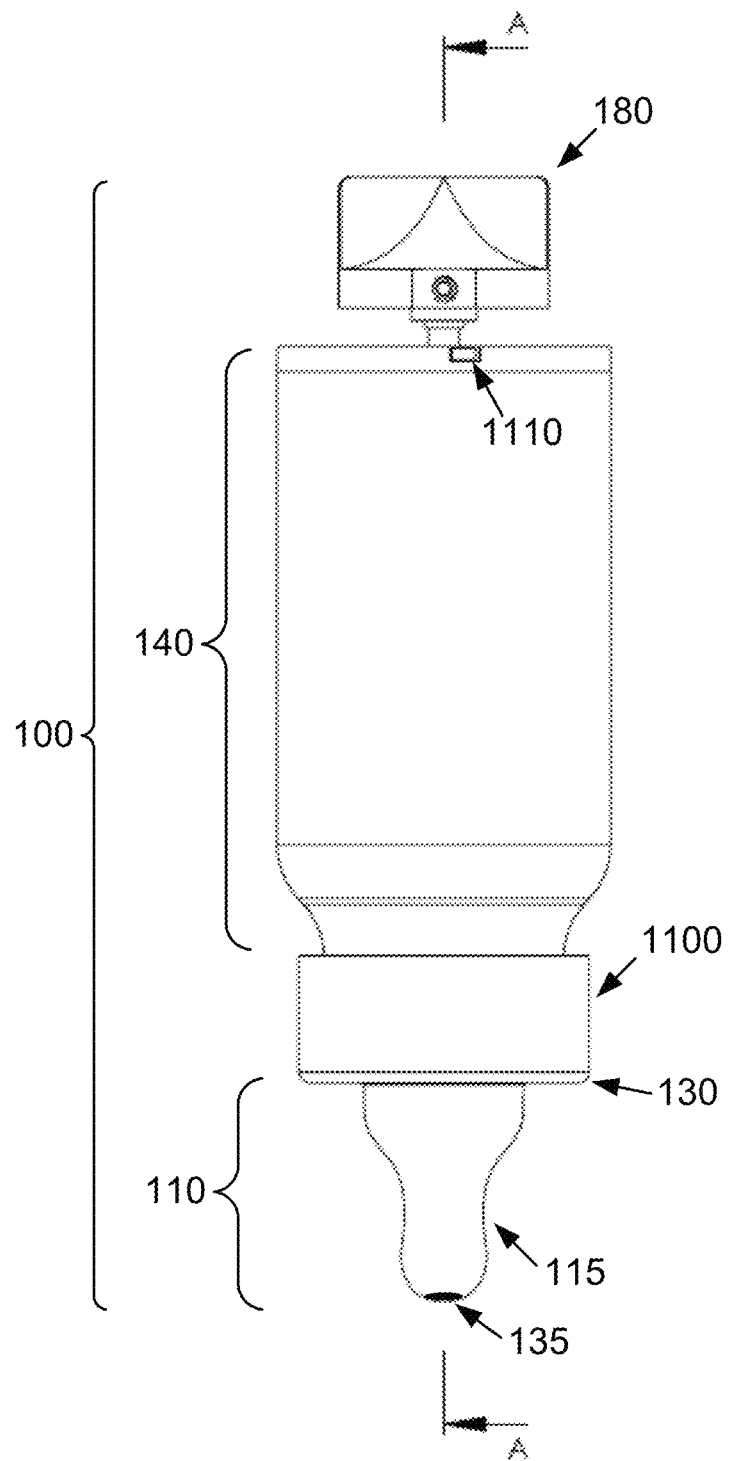
FIG. 12 is an illustration depicting aspects of a pacifier device.

FIG. 12 depicts an external view of a pacifier device 100. The illustrated pacifier device 100 includes a pacifier 110 with a nipple 115 and a shield 130. A supplement metering unit 135 is positioned at the distal tip of the nipple 115 at a position opposite to the shield 130. The supplement metering unit 135 connects to the distal end of the conduit for supplement material which is positioned internal to the nipple 115. The pacifier device includes an enclosure 140 which surrounds the internal reservoir, pressure applicator and controller. The enclosure 140 is affixed to an internal base and the attached pacifier 110 with a securing element 1100. A user interface 180 configured as a dial is positioned at the distal face of the enclosure 140 from the pacifier 110. The user interface is connected to the internal features of the device. In the illustrated embodiment, a reset pin 1110 is positioned adjacent to the base of the dial, the reset pin 1110 positioned within a channel which is within the edge of the enclosure 140. In some embodiments, the reset pin be integrated into a switch utilized by a user to rest a mechanical controller.

Figure 13:
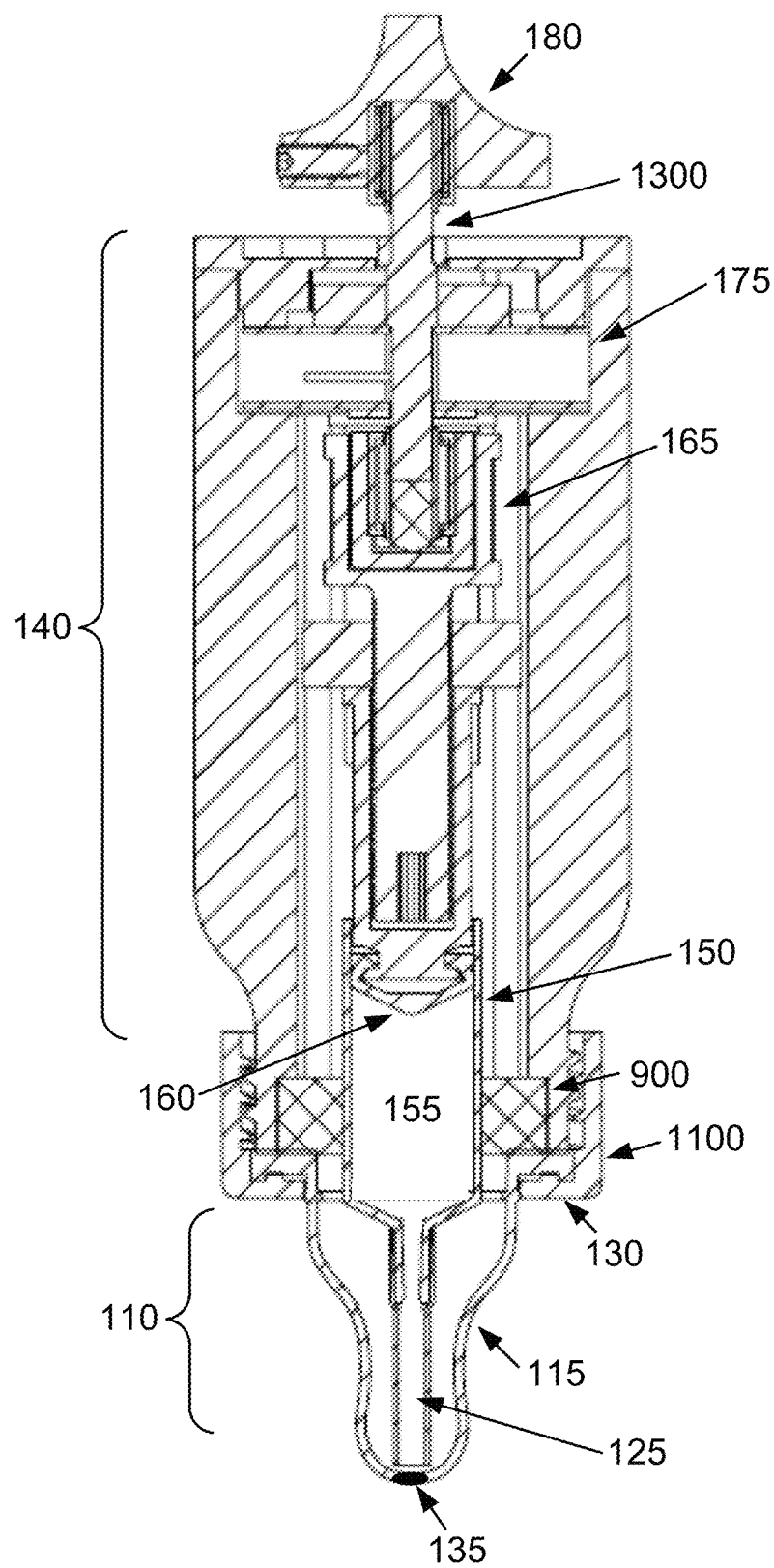
FIG. 13 is an illustration depicting aspects of a pacifier device.

FIG. 13 depicts a cross-section view of the embodiment of FIG. 12, depicted through a plane denoted "A" in FIG. 12. The lower portion of the Figure includes the pacifier 110, including the nipple 115. Traversing the nipple 115 from the base to the distal portion is a conduit 125. The conduit 125 terminates at the tip of the nipple 115, positioned so that supplement material flowing though the conduit can exit at the supplement metering unit 135, which is configured as a flexible membrane is positioned at the end of the conduit 125 adjacent to the base of the nipple 115. The nipple 115 is secured to the end of the enclosure 140 with a securing element 1100. In the illustrated embodiment, the securing element 1100 includes a mating surface with screw threads configured to reversibly mate with screw threads on the adjacent surface of the enclosure 140. The face of the securing element 1100 facing the base of the nipple 115 forms a shield 130.

Adjacent to the base of the nipple 115, the conduit 125 connects to an end of the reservoir 150. A pressure plate 160 of a pressure applicator is positioned within the reservoir 150, oriented so that the pressure applicator forces supplement material 155 within the reservoir 150 into the conduit 125. The length of the reservoir walls can be made longer or smaller to accommodate different volumes of supplement material within the reservoir interior. The pressure applicator also includes a screw mechanism 165, operable attached to the pressure plate 160 so that turning of the screw mechanism 165 operates to add pressure on the pressure plate 160 and the adjacent supplement material within the reservoir 150. The pressure applicator is moved with a user turning the user interface 180 dial and the motion transferred to the screw mechanism 165 via a shaft 1300 affixed to the user interface 180 dial.

Motion of the user interface 180 dial and the attached shaft 1300 is limited by the controller 175. The controller 175 limits motion of the shaft 1300 responsive to a timer attached to the controller 175. After a predetermined period of time has elapsed, the timer signals the controller 175 to permit the shaft to turn a limited amount in order to dispense a predetermined amount of supplement material, such as a single daily dose. After a user has turned the dial sufficiently to dispense the correct amount for that unit of time, the controller stops the motion of the shaft and a user is unable to turn the dial until the timer again signals the controller in response to an elapsed period of time. In some embodiments, the controller will allow different amounts of control relative to elapsed dosing time, for example a half-dose may be available after half of a dosing interval is reached. Some embodiments also include slip bearings around the user interface dial so that a user who turns the dial in the opposite direction from the dispensing direction does not cause damage the mechanism.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A pacifier device for metered dosing of supplement material to infants, comprising:
   a user interface mechanism;
   a reservoir of a size and shape to contain a multi-dose supply of a supplement material;
   a pacifier affixed to the reservoir, the pacifier including a nipple with a conduit between the reservoir and an aperture positioned at a distal region of the nipple;
   a supplement metering unit affixed to the conduit and positioned at the distal region of the nipple;
   a pressure applicator affixed to the reservoir;
   a controller including a timer and with a reversible mechanical interface to the pressure applicator, the timer configured to connect the pressure applicator to the user interface mechanism only at predetermined time intervals, the reversible mechanical interface attached to the timer; and
   a switch positioned for use by a caregiver, the switch including an interface to the controller, wherein the reservoir, the supplement metering unit, the pressure applicator, the controller and the switch are of a size and shape for a child to maintain the nipple in a mouth of the child while using the pacifier device.

2. The pacifier device of claim 1, wherein the reservoir comprises: an enclosure of a size and shape to retain between 30 and 90 doses of the supplement material.

3. The pacifier device of claim 1, wherein the reservoir comprises: an enclosure formed to enclose paste material.

4. The pacifier device of claim 1, wherein the reservoir comprises: an enclosure formed to enclose gel material.

5. The pacifier device of claim 1, wherein the reservoir comprises: an enclosure formed to enclose liquid material.

6. The pacifier device of claim 1, wherein the supplement metering unit comprises: a sheet of flexible material including an aperture positioned adjacent to an end of the conduit within the pacifier.

7. The pacifier device of claim 1, wherein the pressure applicator comprises: a screw mechanism with a pitch sufficient to provide a force against the reservoir to extrude a dose of the supplement material; and a pressing plate attached to the screw mechanism in a position adjacent to the supplement material within the reservoir.

8. The pacifier device of claim 1, wherein the controller comprises: a mechanical controller.

9. The pacifier device of claim 1, wherein the controller comprises: an electronic controller.

10. The pacifier device of claim 1, wherein the controller comprises: a combination of an electronic controller and a mechanical controller.

\* \* \* \* \*